United States Patent
Dropps et al.

(10) Patent No.: US 10,628,365 B2
(45) Date of Patent: Apr. 21, 2020

(54) PACKET TUNNELING FOR MULTI-NODE, MULTI-SOCKET SYSTEMS

(71) Applicant: Hewlett Packard Enterprise Development LP, Houston, TX (US)

(72) Inventors: Frank R. Dropps, Eagan, MN (US); Michael Anderson, Chippewa Falls, WI (US); Michael Malewicki, Chippewa Falls, MI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 150 days.

(21) Appl. No.: 15/816,385

(22) Filed: Nov. 17, 2017

(65) Prior Publication Data
US 2019/0155779 A1    May 23, 2019

(51) Int. Cl.
*G06F 13/40*    (2006.01)
*G06F 13/42*    (2006.01)

(52) U.S. Cl.
CPC ...... *G06F 13/4068* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 7,606,933 B2 | 10/2009 | Reinhard et al. | |
| 7,917,729 B2 | 3/2011 | Georgiou et al. | |
| 8,904,079 B2 | 12/2014 | Chang et al. | |
| 2015/0012679 A1 | 1/2015 | Davis et al. | |
| 2017/0185559 A1 | 6/2017 | Hunsaker et al. | |

OTHER PUBLICATIONS

Mayhew, D. et al., "PCI Express and Advanced Switching: Evolutionary Path to Building Next Generation Interconnects," (Research Paper), 2003, pp. 21-29, http://www.hoti.org/archive/Hoti11_program/papers/hoti11_04_mayhew_d.pdf.

Potluri, S. et al., "MVAPICH-PRISM: a Proxy-based Communication Framework Using Infiniband and SCIF for Intel," (Research Paper), Nov. 17, 2013, 11 pages, http://dl.acm.org/citation.cfm?id=2503288.

*Primary Examiner* — Idriss N Alrobaye
*Assistant Examiner* — Dayton Lewis-Taylor
(74) *Attorney, Agent, or Firm* — Hewlett Packard Enterprise Patent Department

(57) ABSTRACT

Multi-node, multi-socket computer systems and methods provide packet tunneling between processor nodes without going through a node controller link. On receiving a packet, the destination node identifier (NID) is examined, and if it is not same as the source socket, then the packet request address is examined. If it is determined that the packet is not for a remote connected socket, then the packet's destination NID and source socket NID are replaced along with recalculated data protection information. The modified packet is then sent to the destination socket over another processor interconnect path.

15 Claims, 5 Drawing Sheets

PACKET TUNNELING FOR MULTI-NODE, MULTI-SOCKET SYSTEMS

BACKGROUND

In computer systems having multiple central processing units (CPUs) that operate faster than the main memory they use, providing separate memory for each processor can alleviate the reduction in performance that occurs when several processors attempt to address the same memory. When more than one processor requires the data stored on a memory, including additional hardware to move data between memory banks slows the processors attached to those banks. In response to such issues, non-uniform memory access (NUMA) computer architectures have been developed to provide high-bandwidth, memory-coherent connectivity between processors in multi-processor systems.

High performance processors designed for such multi-processor systems can support a memory-coherent packet interface between a small number of processor sockets, by which messages can be transferred between sockets via high-speed intersocket links known as processor interconnects. The resulting group of interconnected processor sockets is often referred to as a node or clump. This processor packet interface may also support node controllers used to coherently interconnect a number of processor nodes into a larger shared-memory multi-processor system. The processor sockets have a limited number of socket identifiers, such that from a given processor socket's perspective, there are a limited number of other sockets visible. A node controller may proxy many remote nodes or sockets as one socket with a very large memory using secondary interconnect network that is lower bandwidth than processor interconnects within each node.

DETAILED DESCRIPTION

In the present disclosure, packets are tunneled between processor nodes without consuming additional node identifiers (NIDs), and in some examples without going through a node controller interconnect. The resultant systems and methods provide higher bandwidth, lower latency inter-node communication, and permit the use of less-capable processor sockets, resulting in systems of reduced cost.

Figure 1:
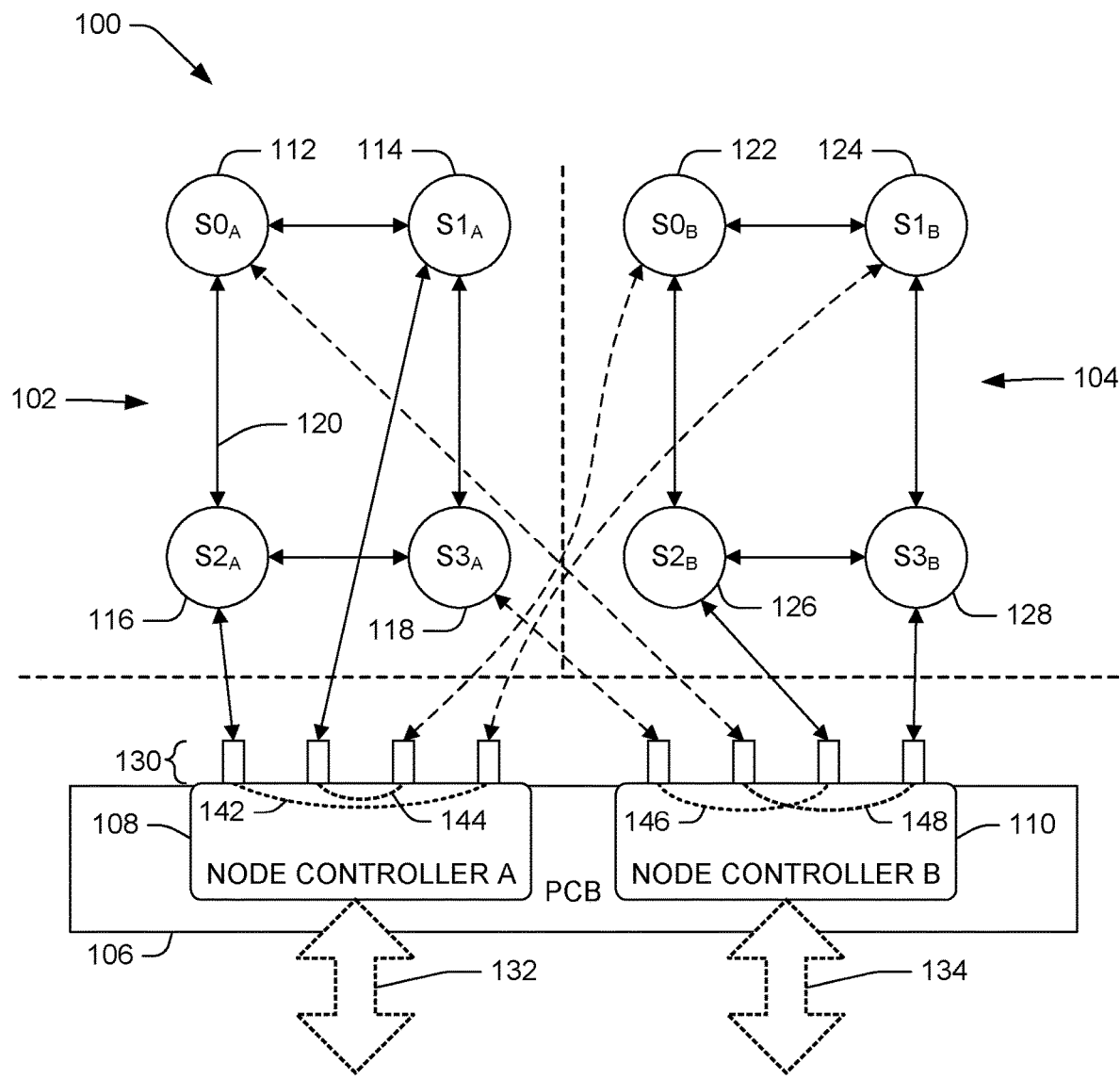
FIG. 1 is system block diagram depicting an example multi-node, multi-socket computer system with packet tunneling.

FIG. 1 illustrates an example multi-node, multi-socket system 100 with packet tunneling. In the drawing, two thick dashed lines not terminated by arrows divide system 100 into three sections, the sections generally comprising two nodes, i.e., Node A 102 and Node B 104, and a printed circuit board (PCB) 106 having node controllers associated with each of the nodes, e.g., Node Controller A 108 and Node Controller B 110. Each node controller can be, for example, an application-specific integrated circuit (ASIC). In the illustrated example, Node A comprises four interconnected sockets, $S0_A$ 112, $S1_A$ 114, $S2_A$ 116, and $S3_A$ 118. Similarly, Node B comprises four interconnected sockets, $S0_B$ 122, $S1_B$ 124, $S2_B$ 126, and $S3_B$ 128. Sockets within a node can be interconnected by high-bandwidth, bidirectional processor interconnects, shown in FIG. 1 as solid lines with arrowheads at each end. For example, processor interconnect 120 connects sockets $S0_A$ 112 and $S2_A$ 116. Each processor interconnect can be, for example, a point-to-point connection that is a multi-bit-wide, multi-lane serial interface, e.g., traces on a printed circuit board (PCB) or optical links. The processor interconnects can conform, for example, to Intel's UltraPath Interconnect (UPI) standard, which at present permits for speeds of 10.4 gigatransfers per second (GT/s). As illustrated in FIG. 1, the sockets of system 100 are three-port sockets, i.e., they each can be connected to other sockets or node controllers by a maximum of three high-bandwidth processor interconnects.

The node controllers 108, 110 need not be linked by a PCB, and other examples may have more or fewer node controllers than are shown in FIG. 1. Similarly, although two nodes 102, 104 are illustrated, other examples may include more nodes than shown in FIG. 1, and although each node is shown as having four sockets, each node may have a smaller or larger number of sockets, greater than one. As well, in other examples, sockets may have a greater number of ports for processor interconnects.

Each socket 112, 114, 116, 118, 122, 124, 126, 128 is a computer processor complex consisting at least of a processor and a main memory connected by a memory bus that is unique to its socket, and may further consist of one or more input/output (I/O) devices. Each processor may be implemented on a single chip or a single multi-chip module, or may comprise multiple chips. Each processor may have multiple cores and/or may be multi-threaded. The processor complex of each socket may have multiple processors.

In a multi-socket system such as system 100, each socket may communicate with any other socket via a network of high-bandwidth processor interconnects and lower-bandwidth links. For example, messages may be sent from one socket to another socket in packetized form over such interconnects and links. As examples, such messages may comprise requests for data (e.g., one or more operands) stored in memory of a certain socket; responses providing such data; commands instructing a certain socket to execute one or more processing routines; socket status notifications; and/or other messages. This functionality permits the system 100 the requisite intersocket communication capability to distribute memory storage and processing loads among sockets, and thus to realize speeds associated with distributed computing, which are particularly useful for computing tasks that are highly parallel in nature.

Spatial configuration considerations and costs associated with increasing processor pin density per socket may limit the number of interconnects on each socket, e.g., to three or four. Consequently, it may not be practicable for each socket to be directly connected via a processor interconnect to each other socket in the same node. Moreover, inter-node communications between sockets in different nodes (e.g., between $S0_A$ 112 and $S0_B$ 122) can require the messages to be routed through at least one node controller. Each node controller is therefore equipped with a plurality of processor ports to facilitate connections with sockets. In the illustrated example 100, each node controller 108, 110 has four such processor ports 130. Each node controller is also equipped with node controller link ports by which node controllers can interface with other node controllers in the multi-node system to provide internode communication. Thus, for example, in illustrated system 100, each node controller 108, 110 has sixteen node controller link ports 132, 134, respectively, by which connections to other node controllers can be made over node controller links (e.g., NUMAlink system interconnects). In FIG. 1, the thick arrows 132, 134 represent multiple node controller links.

From the perspective of any individual socket in a node, a node controller connected to the node by one or more processor interconnects acts as a proxy for potentially many sockets behind it. Said node controller may therefore represent a single socket or a plurality of sockets. To facilitate addressing of messages between sockets, each socket is assigned a node identifier (NID) that is unique within the corresponding node. The number of unique node identifiers in each individual node may be limited. For example, each node may have ten or fewer NIDs, e.g., eight NIDs, six NIDs, or four NIDs. Thus, from the perspective of any individual socket, it may have the same NID as another socket in a different node, and one or more other sockets in its node may have the same NIDs as sockets in a different node. Unambiguous addressing of internode messages between sockets of different nodes can therefore require address translation effort on the part of the node controllers, which act as intermediary hubs between sockets of different nodes.

System 100 in FIG. 1, for example, illustrates a six-NID system which, absent the tunneling described herein, would have to be an eight-NID system to accommodate communication between eight sockets without having to send messages through node controller links. Packet transmission over node controller links, such as links 132, 134, incurs increased latency versus transmission over processor interconnects, owing to any of several factors, including lower bandwidth of node controller links as compared to processor interconnects, added link serialization, and/or other processing steps associated with participating in a cache coherency protocol. The incurred additional latency negatively impacts the overall performance of a system such as system 100.

Packet tunneling features of the present disclosure will now be described. In the example of system 100, where node controllers 108, 110 each have four processor ports 130 for connection to sockets via high-bandwidth processor interconnects, each node controller 108 can be connected directly to sockets of different nodes 102, 104 via high-bandwidth processor interconnects (shown as broken lines with arrowheads at each end), and two of the processor ports on each node controller can share their NIDs with two other processor ports on the same node controller, as indicated by broken lines 142, 144, 146, 148. Thus, in the illustrated example, the outer two processor ports 130 of Node Controller A 108 are addressed by respective connected sockets $S2_A$ 116 and $S1_B$ 124 using one and the same NID, as illustrated by broken line 142, and the inner two processor ports 130 of Node Controller A 108 are addressed by respective connected sockets $S1_A$ 114 and $S0_B$ 122 using another single NID, as illustrated by broken line 144. Similarly, in Node Controller B 110, the two processor ports 130 indicated by broken line 146 are both addressed using a single NID by respective connected sockets $S3_A$ 118 and $S2_B$ 126, and the two processor ports 130 indicated by broken line 148 are both addressed using another single NID by respective connected sockets $S0_A$ 112 and $S3_B$ 128. Node controller processor ports on the same node controller that share the same NID are herein termed "companion" node controller processor ports.

Packets arriving from socket $S2_A$ 116 at Node Controller A 108 can thus be tunneled to socket $S1_B$ 124, i.e., from Node A 102 to Node B 104, without having to pass through a lower-bandwidth node controller link 132/134 and without requiring the associated link serialization and other processing steps. The reverse is likewise true: packets arriving from socket $S1_B$ 124 in Node B 104 can be tunneled to socket $S2_A$ 116 in Node A 102 via Node Controller A 108. Similarly, packets arriving from socket $S1_A$ 114 at Node Controller A 108 can be tunneled to socket $S0_B$ 122, and vice versa; packets arriving from socket $S3_A$ 118 at Node Controller B 110 can be tunneled to socket $S2_B$ 12, and vice versa; and packets arriving from socket $S0_A$ 112 at Node Controller B 110 can be tunneled to socket $S3_B$ 128, and vice versa. This tunneling saves from having the packets going through the coherence protocol processing required to maintain the memory-coherence or the directory look-ups on the node controller.

Tunneled packets therefore behave nearly as if sent between sockets within the same node, permitting the node controllers to link together larger numbers of nodes over high-bandwidth connections using fewer available NIDs and therefore using lower-cost processors in the sockets. When tunneling a packet from a socket of one node to a socket of another node, a node controller can, in effect, "intercept" the packet to alter the source and destination NIDs in the packet so that the packet is properly addressed to a socket of a different node whose set of NIDs may overlap with the NIDs used in the node of the source socket.

The following example illustrates communications between sockets within the same node. When, in order to perform a processing task, a requesting socket (e.g., $S1_A$ 114 in Node A 102) needs to retrieve a data value in memory of a providing socket in the same node (e.g., $S2_A$ 116 in Node A 102), an internal directory in the requesting socket can associate a NID of the providing socket with the memory range known by the requesting socket to store the desired data value. The requesting socket can formulate a request packet with the request for the desired data to be sent to the providing socket by addressing the request packet with the NID of the providing socket given by the requesting socket's internal directory. The request packet can also be formulated to include the NID of the requesting socket as a "return address." In the example of system 100, because $S1_A$ 114 and $S2_A$ 116 are not directly connected by a processor interconnect, the packet is sent via either of the intermediate sockets, $S0_A$ 112 or $S3_A$ 118 Upon receipt of the packet, the receiving intermediate socket can compare the packet address NID to its own NID to understand that the packet is not intended for the intermediate socket, and the intermediate socket can therefore forward the packet on to the intended destination socket $S2_A$ 116. Upon receipt of the data request packet, the providing socket (e.g., $S2_A$ 116) can formulate a response packet including part or all of the requested data addressed to the NID of the requesting socket, and can send that packet out via a processor interconnect to a connected node. Where the connected node is not the intended destination requesting socket, the connected node can forward the packet on through the intranode network of processor interconnects until it arrives at its destination.

When, however, a requesting socket in first node (e.g., $S0_A$ 112 in Node A 102) needs to retrieve a data value in memory of a providing socket in a second node (e.g., $S3_B$ 128 in Node B 104), the internal directory in the requesting socket still associates a NID with the memory range known to store the desired data value, but this NID is not the NID of the providing socket. Instead, it is a NID associated with a processor port of a node controller (e.g., the second-from-left processor port 103 of Node Controller B 110). In the example system 100, which enables packet tunneling, when a node controller (e.g., Node Controller B 110) receives such a packet, it can tunnel the request packet directly to a providing socket in the other node (e.g., $S3_B$ 128 in Node B 104), without sending the request packet through a node controller link and without participating in the coherency protocol, by first making some adjustments to the request packet, including the alteration of the source and destination NIDs in the request packet.

Upon receipt of the request packet, the providing socket in the second node (e.g., $S3_B$ 128 in Node B 104) can formulate a response packet including a destination NID, which, rather than being the NID of the requesting socket, can be a NID associated with a processor port of a node controller (e.g., the rightmost processor port 103 on Node Controller B 110), which can then tunnel the response packet back to a socket in the requesting socket's node (e.g., Node A 102), by first making some adjustments to the response packet, including the alteration of the source and destination NIDs in the response packet. The precise format of formulated packets sent between sockets can vary based on the make and model of the processor interconnects, and, hence, the processors used in the sockets. Thus, for example, processors made by Intel, AMD, ARM, and NVIDIA may each have different formats for their inter-socket packets. Every type of packet, however, will have some type of destination NID.

The packet tunneling described herein can not only tunnel request packets between sockets in different nodes, but can also tunnel response packets within a node controller. The example quad-socket configuration 200 shown in FIG. 2 includes at least four sockets $S0_C$ 202, $S1_C$ 204, $S2_C$ 206, and $S3_C$ 208, along with two node controllers NCD 210 and NCE 212, which can be connected to each other via node controller link 218 or to other node controllers (not shown) via other node controller links 214, 216 associated with the node controllers 210, 212, respectively. The node controller links can be, for example, NUMAlinks. The topology in configuration 200 benefits by having two node controllers, as opposed to just one, in terms of performance, because a message transmitted through a second socket may incur a transmission speed penalty of, for example, between about 70 and 100 nanoseconds. Node controllers NCD 210 and NCE 212 each have only two processor ports. Rather than consuming two NIDs for its ports, by which it connects to sockets $S0_C$ 202 and $S2_C$ 206, NCD 210 uses only one NID for both of its processor ports. Similarly, rather than consuming two NIDs for its ports, by which it connects to sockets $S1_C$ 204 and $S3_C$ 208, NCE 212 uses only one NID for both of its processor ports.

Figure 2:
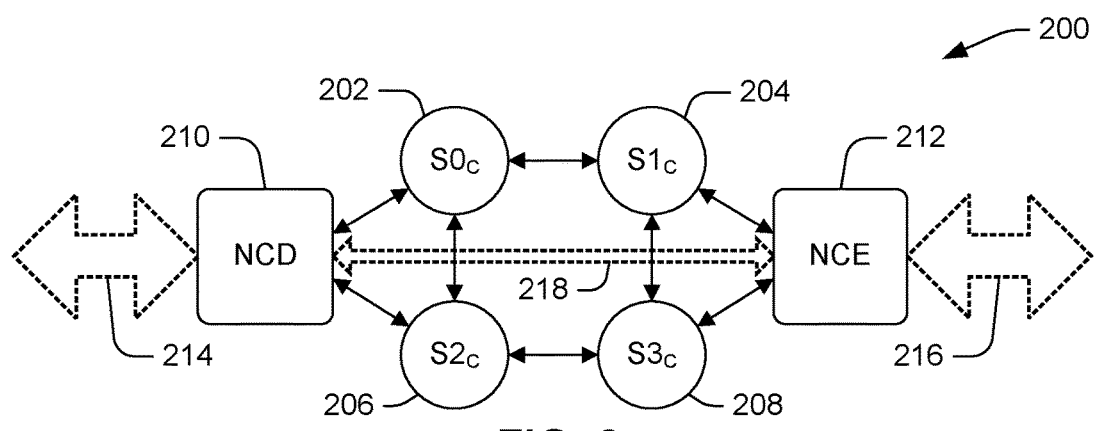
FIG. 2 is system block diagram depicting an example multi-node, multi-socket computer system with packet tunneling.

In contrast to the configuration 100 of FIG. 1, in which tunnel path routing within a node controller requires packet modification, tunnel path routing in configuration 200 of FIG. 2 does not. In configuration 200, a response packet that contains correct routing information may be returned to a companion node controller processor port and not the requesting node controller processor port in some instances depending on the memory block ownership within the processor complex. The scoreboarding and tracking of the response packet is done by the node controller processor port that launched the request packet into the processor complex and not by the companion port. Because both processor ports share the same NID on the node controller, the processor complex cannot differentiate where the request packet came from. The routing tables in a socket therefore would send a response packet addressed to either companion node controller port NID out to the node controller through the node controller port directly attached to the response-transmitting socket irrespective of whether such path was the same as the path on which the request packet traveled, and irrespective of whether the proper return path may be through the companion node controller port rather than the directly-attached node controller port. As further explained in detail with regard to FIG. 6, the packet tunneling of the present disclosure accommodates the case where a response packet arrives on a different processor port of a node controller than the processor port on which the request packet was sent out.

Figure 3:
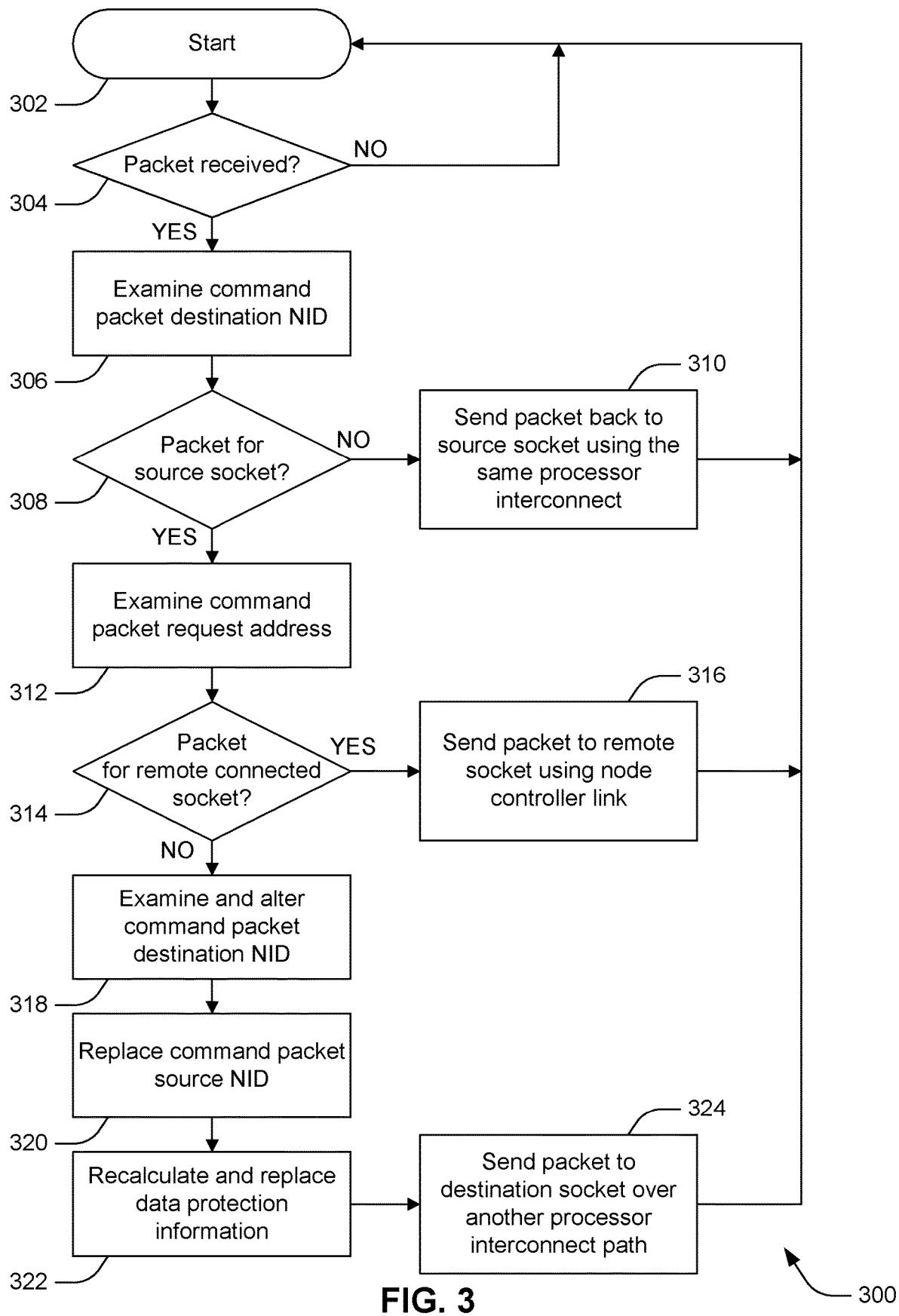
FIG. 3 is a flow chart of an example method of packet tunneling.

FIG. 3 illustrates a method 300 of packet tunneling that can be used, for example, in a system like system 100 shown in FIG. 1. At the start 302 of method 300, a node controller receives a command packet 304 and examines 306 the destination NID of the command packet. If the command packet is a request for a data operand in a cache line, for example, it can have been formulated by a socket following a miss signal from the socket's own cache, whereupon the socket will have determined the NID having ownership of the cache line from a directory in the socket. Another lookup by the socket can have provided the particular port on the socket, and thus the particular processor interconnect, on which to send the command packet, such that the command packet eventually is routed to the node controller. Based on determining 308 that the command packet is for the source socket, or another socket in the source node, the node controller sends 310 the command packet back to the source socket using the same processor interconnect on which the command packet was received, and the node controller awaits 302 its next packet receipt.

Based on determining 308, however, that the command packet is not for the source socket, the node controller examines 312 the command packet request address to determine 314 whether the command packet is for a remote connected socket, i.e., for a socket in a node that the node controller is not directly connected to by at least one high-bandwidth processor interconnect. The command packet request address is not a NID, but rather a memory address or range indicative, for example, of the cache line being requested. In each socket is a directory indicative of whether a memory address is local to the socket or remote (i.e., within memory associated with a different socket). The command packet includes not only a destination NID but also the request address in the form of a memory address in a global address space. The node controller, which is a proxy for potentially many sockets in many nodes, can interpret the request address, with the aid of a directory in the node controller, to determine the appropriate node to forward the command packet onto. Based on determining 314 that the command packet is for a remote connected socket (and, therefore, that no packet tunneling is possible), the node controller sends 316 the command packet to the remote socket over a node controller link (which may also be called a node controller interconnect), and the node controller awaits 302 its next packet receipt. This completes a "standard operation" path, as opposed to the tunneling path described below.

Based on determining 314, however, that the command packet is not for a remote connected socket (and, therefore, that packet tunneling is possible), the node controller can use a lookup table within the node controller to determine the appropriate destination NID for the command packet in the NID domain of the destination node. The node controller thereby examines and alters 318 the command packet destination NID (which was formerly the NID of a processor port on the node controller) to the NID of the destination socket in the destination node, replaces 320 the command packet source NID to a NID associated with a processor port on the node controller, and recalculates and replaces 322 data protection information in the command packet, e.g., a cyclic redundancy check (CRC) code in the command packet. The node controller then sends 324 the command packet to a destination socket over a different processor interconnect path than the processor interconnect path from which the command packet was received. Actions 318, 320, 322, and 324 represent the tunneling path of method 300 and permit the packet tunneling functionality. A process similar to method 300 can correctly route a response packet, sent in response to the command packet, using packet tunneling, as appropriate.

With the above-described tunneling, system 100 also permits node controllers 108, 110 not to have to consume one node controller link each to connect with each other, freeing up those links for connections to other node controllers elsewhere in the system (not shown). The tunneling further allows two processor ports 130 in each node controller to share the same NID, thus preventing the consumption of NIDs.

Figure 4:
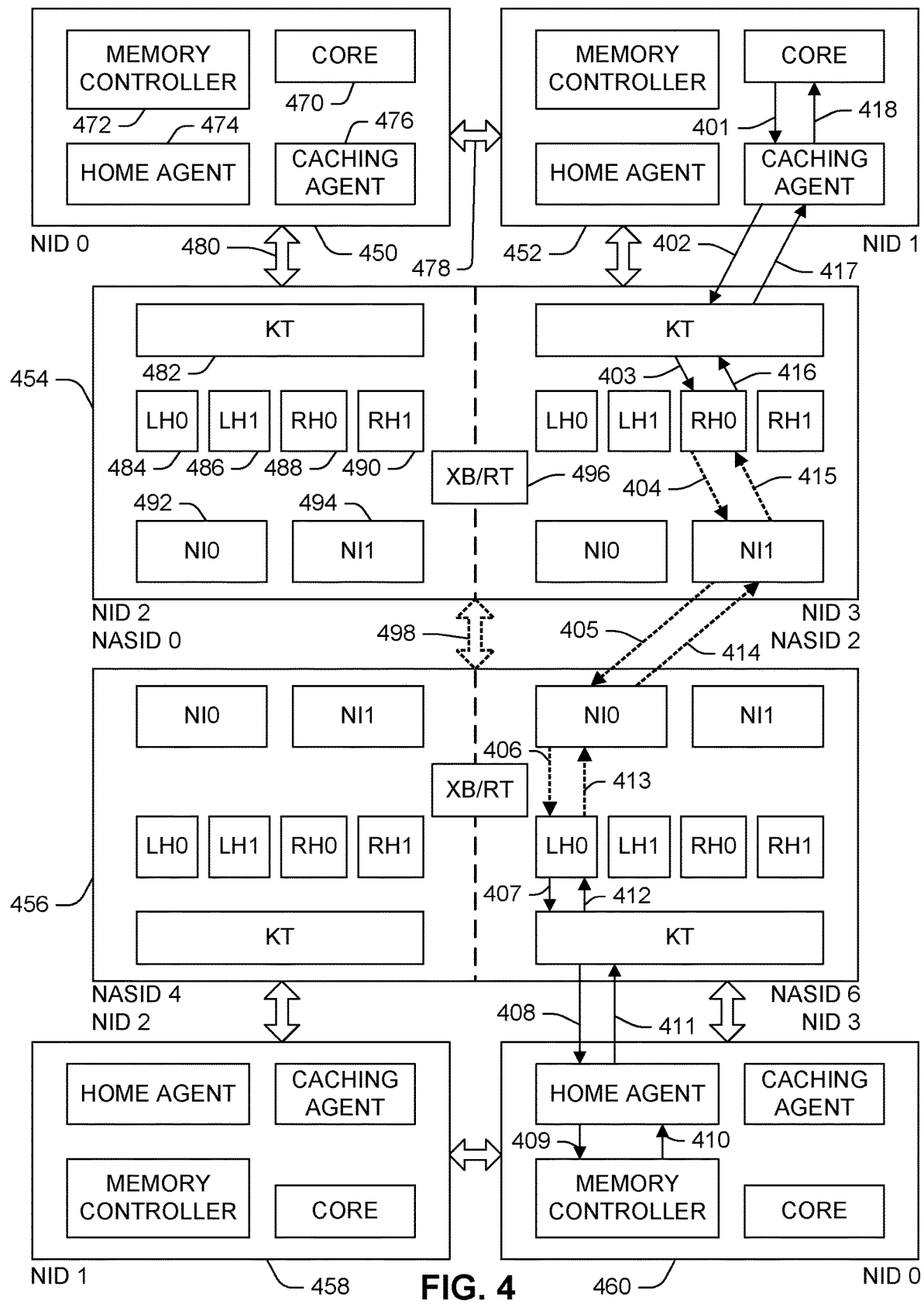
FIG. 4 is a block diagram of an example portion of a multi-node, multi-socket computer system showing a message transmission sequence without packet tunneling.

FIG. 4 shows a portion of a multi-socket, multi-node system illustrating the flow of command and response packets through the system in a standard operation path. The packet flows are indicated, in chronological order, by arrows sequentially numbered 401-418. FIG. 4 shows, at the top, two sockets 450, 452 in a first node and, at the bottom, two sockets 458, 460 in a second node. Topologically between the nodes are two node controllers 454, 456. Intranode communication is facilitated by the assignment of NIDs to sockets and node controller processor ports, whereas node controllers assign a different set of identifiers in a different address space, here denoted as NASIDs, to facilitate intranode communication between sockets in different nodes proxied by node controllers, each node controller processor port in the system having a unique associated NASID. Socket 450 comprises core 470, memory controller 472, home agent 474, and caching agent 476. Other sockets 452, 458, 460 are configured similarly. Ports on socket 450 can be connected via high-bandwidth processor interconnects to ports on other sockets and/or processor ports on node controllers. Thus, for example, processor interconnect 478 connects socket 450 with socket 452, while processor interconnect 480 connects socket 450 with node controller 454. The other sockets have similar connections, which, for simplicity of illustration, are not assigned reference labels.

Within node controller 454 are two divisions separated by a broken line. The left side has blocks (e.g., chiplets) including socket interface block KT 482, local home blocks LH0 484 and LH1 486, remote home blocks RH0 488 and RH1 490, and system interconnect interface blocks NI0 492 and NI1 494. Socket interface blocks KT can each correspond to a processor port of the respective node controller (e.g., processor ports 130 shown in FIG. 1). System interconnect interface blocks NI0 492 and NI1 494 can be, for example, NUMAlink interfaces. The right side of node controller 454 is similarly arranged. Connecting the left side to the right side is crossbar XB/RT 496. Node controller 456 is similarly arranged. The blocks described within the node controller are exemplary and a node controller may include other blocks and more or fewer of the blocks described. Node controllers can be connected by node controller links that may be of lower bandwidth than the processor interconnects. Thus, for example, node controllers 454 and 456 are connected by node controller link 498, rendered as a broken-outline double-headed arrow at the center of FIG. 4.

In the description that follows, Intel abbreviations for messaging types are provided in parentheses following the description of the particular signals in the described packet flows. The abbreviations are intended to aid understanding of the described examples in the context of intersocket communication in multiprocessor systems generally. The examples are not, however, limited to Intel-based systems, but instead can be implemented in any multisocket (e.g., NUMA-type) computer system.

Referring to FIG. 4, during standard operation (i.e., not involving packet tunneling), the core of requesting socket 452, having NID 1, formulates a request for ownership packet (RFO) and issues 401 the request for ownership packet to the caching agent of requesting socket 452. The caching agent has a source address decoder (SAD) used to determine which socket in the system owns the requested cache line. In this case, because the requested cache line is owned on a socket in a remote node the caching agent's SAD points to node controller 454 as owning the line, node controller 454 being a proxy for all sockets on remote nodes. A command packet, e.g., in the form of a read invalidate own request for a cache line (RdInvOwn), is formulated and transmitted 402 out the appropriate port over the processor interconnect connecting socket 452 to node controller 454, having NID 3.

Within node controller 454, socket interface block KT acts as both a link layer and a routing layer for the received command packet, and sends 403 the received command packet (RdInvOwn) to remote home block RH0. Remote home blocks in a node controller are responsible for handling of all requests that are going to a node that is remote from any socket directly attached to the node controller. Remote home block RH0 has a global address map (GAM), which is similar to the SAD, in that the GAM determines which node controller link (e.g., NUMAlink) connects to a node controller acting as a proxy for the socket owner of the requested cache line. In the illustrated example, the route determined by remote home block RH0 results in the sending 404 of the command packet (RdInvOwn) to system interconnect interface block NI1, which acts as the link layer on the node controller link side. The command packet (RdInvOwn) is then sent 405 over node controller link 498 (e.g., a NUMAlink network fabric) to node controller 456, corresponding to action 316 in FIG. 3.

Node controller 456 has NID 3 within its own node. Within node controller 456, system interconnect interface block NI0 sends 406 the command packet (RdInvOwn) to local home block LH0. Local home block LH0 acts as a home agent from the standpoint of a node controller link, but can convert a request taken in over a node controller link to one sent out over a processor interconnect to socket, from which standpoint it acts as a requesting agent, and will track the request in the protocol of the processor interconnect until the completion is returned. Local home block LH0 accordingly sends 407 the command packet (RdInvOwn) to socket interface block KT (the link layer) for transmission out a processor port.

Node controller 456 then transmits 408 the command packet (RdInvOwn) over a high-bandwidth processor interconnect to directly-attached socket 460, having NID 0 within its node. Because the requested cache line is not owned by any other socket in the node, the home agent of socket 460 in turn sends 409 the cache line request from the command packet (rd to the memory controller to fetch 410 the requested cache line data operand (Data). The home agent of socket 460 formulates a response packet consisting of data with an ordered completion response (Data_E_CmpO) which is then sent 411 back out over the processor interconnect to node controller 456.

Within node controller 456, socket interface block KT sends 412 the data response packet (Data_E_CmpO) to local home block LH0, which then sends 413 the response packet (Data_E_CmpO) to system interconnect interface block NI0. Node controller 456 transmits 414 the response packet (Data_E_CmpO) over a node controller link to node controller 454. Within node controller 454, system interconnect interface block NI1 sends 415 the response packet (Data_E_CmpO) to remote home block RH0, which then sends 416 the response packet (Data_E_CmpO) to socket interface block KT.

Node controller 454 then transmits 417 the response packet (Data_E_CmpO) to requesting socket 452 over the high-bandwidth processor interconnect that connects node controller 454 and socket 452. The caching agent of socket 452 then sends 418 the requested data (Data) in the response packet to the core of socket 452.

Figure 5:
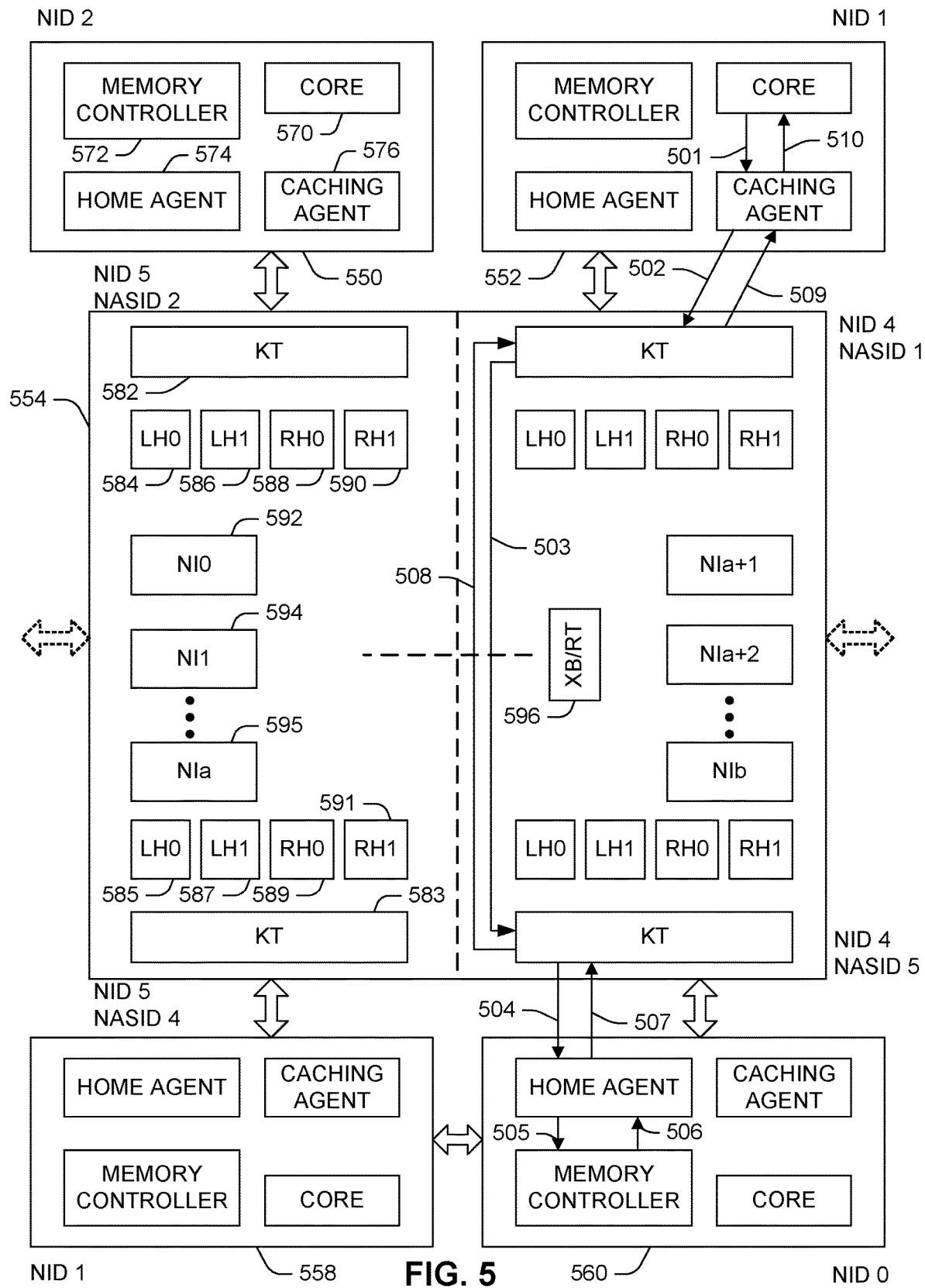
FIG. 5 is a block diagram of an example portion of a multi-node, multi-socket computer system showing a message transmission sequence with packet tunneling.

FIG. 5 shows a portion of a multi-socket, multi-node system illustrating the flow of command and response packets through the system in an example packet tunneling operation path. The packet flows are indicated, in chronological order, by arrows sequentially numbered 501-510, thus illustrating the functioning of a system like that of FIG. 1, which can effectively make a two-node, four-socket system behave as an eight-socket glueless system under some conditions. Sockets 550, 552, 558, and 560 can correspond, for example, to sockets 114, 116, 122, and 124 in FIG. 1, respectively, such that sockets 550, 552 at the top of FIG. 5 belong to one node while sockets 558, 560 at the bottom of FIG. 5 belong to a different node, just as with the top and bottom sockets in FIG. 4. Each of sockets 550, 552, 558, 560 can be configured as shown and described previously with respect to sockets 450, 452, 458, 460 in FIG. 4, i.e., each with a memory controller (e.g., memory controller 572), core (e.g., core 570), home agent (e.g., home agent 574), and caching agent (e.g., caching agent 576). Topologically between the sockets is node controller 554, which can correspond, for example, to Node Controller A 108 in FIG. 1. Sockets 550, 552, 558, 560 bidirectionally connect to node controller 554 via high-bandwidth processor interconnects illustrated as solid-outline, double-headed arrows. Any two sockets within a node may or may not connect directly to each other via high-bandwidth processor interconnects. Thus, as shown in FIG. 5, sockets 558 and 560 are so connected whereas sockets 550 and 552 are not.

Within node controller 554 are two divisions separated by a broken line. Each division can correspond to multiple processor ports that share a NID. Thus, for example, the left division of node controller 554 in FIG. 5 can correspond to shared-NID ports indicated by dashed line 144 in FIG. 1 whereas the right division of node controller 554 in FIG. 5 can correspond to shared-NID ports indicated by dashed line 142 in FIG. 1. The left division has upper and lower socket interface blocks KT 582, 583, upper and lower local home blocks LH0 584, 585 and LH1 586, 587, upper and lower remote home blocks RH0 588, 589 and RH1 590, 591, and system interconnect interface blocks NI0 592 and NI1 594 through NIa 595. The right division is similarly arranged. Connecting the left division to the right is crossbar XB/RT 596. Within divisions where a NID is shared by multiple KT blocks, the companion KT blocks (e.g., blocks 582 and 583) can be directly connected to facilitate tunneling, which connections correspond to lines 142, 144, 146, and 148 in FIG. 1. Node controller 554 can be connected by node controller links, rendered as a broken-outline double-headed arrows at the center-left and center-right of FIG. 5, that may be of lower bandwidth than the processor interconnects.

In addition to being directly connected as shared-NID companions within a node controller division, the KT blocks can include routing logic for making a routing decision to determine whether a packet received at a KT block must be sent on to an associated local or remote home block within the node controller or, where appropriate, can be tunneled directly to a companion KT block via the direct connections between KT blocks. The routing logic could be implemented in a variety of ways. As an example, the routing logic can include a table containing an index of memory address ranges and logic for performing a table lookup of the index and a comparison of an memory address specified in a command packet with ranges specified in the index, such that for command packets specifying addresses in certain ranges, the packet will be tunneled, while for addresses in other ranges, the packet will not be tunneled. The KT blocks can further include packet modification logic to perform NID and data protection information replacement as in actions 318, 320, and 322 of example method 300 of FIG. 3. The packet modification logic similarly can be implemented in a variety of ways. As an example, the examination of the packet can be for a memory address and another table lookup can match the address to a NID in a remote node.

During an example packet tunneling operation, the core of requesting socket 552, having NID 1, formulates a request for ownership packet (RFO) and sends 501 the request for ownership packet to the caching agent of requesting socket 552, whereupon a command packet, e.g., in the form of a read invalidate own request for a cache line (RdInvOwn), is formulated and transmitted 502 out the appropriate port over the processor interconnect connecting socket 552 to a processor port of node controller 554 having NID 4. Within node controller 554, routing and packet modification logic in the upper socket interface block KT determines that the command packet can be tunneled, makes the appropriate modifications to the command packet, and sends 503 the command packet (RdInvOwn) to the lower socket interface block KT, thereby tunneling the packet by bypassing the remote home (RH), system interconnect interface (NI), and local home (LH) blocks and skipping any packet processing associated therewith. In doing so, the upper KT block of node controller 554 can replace the request packet destination and source NIDs and recalculate and replace data protection information found in the command packet, consistent with actions 318, 320, and 322 shown in FIG. 3.

The command packet (RdInvOwn) is then sent 504 over a high-bandwidth processor interconnect to socket 560, which is in a different node from request packet source socket 552. The home agent of socket 560 sends 505 the cache line request from the command packet (rd) to the memory controller of socket 560 to fetch 506 the requested cache line data operand (Data). The home agent of socket 560 formulates a response packet that includes the fetched data (Data_E_CmpO), which is then sent 507 back out over the processor interconnect to node controller 554.

Within node controller 554, the routing logic in the lower socket interface block KT determines that the response packet can be tunneled, packet modification logic in the KT block makes the appropriate modifications to the packet, and the lower KT block tunnels 508 the response packet (Data_E_CmpO) to the upper socket interface block KT, bypassing the local home (LH), system interconnect interface (NI), and remote home (RH) blocks and skipping any packet processing associated therewith. In doing so, the lower KT block of node controller 554 can replace the response packet destination and source NIDs and recalculate and replace data protection information found in the response packet. The upper socket interface block KT then transmits 509 the response packet (Data_E_CmpO) to requesting socket 552 over the high-bandwidth processor interconnect that connects node controller 554 and socket 552. The caching agent of socket 552 then sends 510 the requested data (Data) in the response packet to the core of socket 552.

Figure 6:
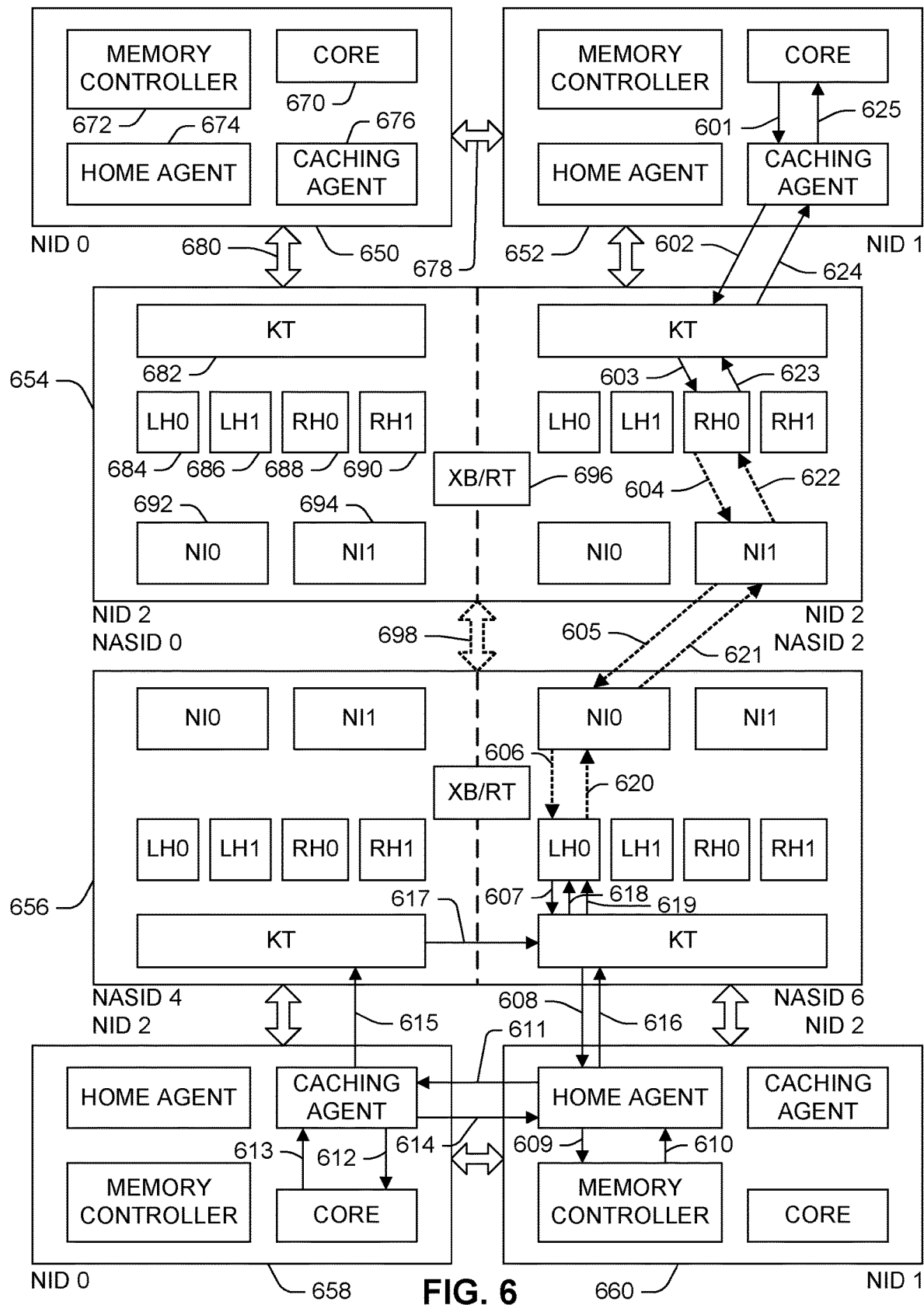
FIG. 6 is a block diagram of an example portion of a multi-node, multi-socket computer system showing a message transmission sequence with packet tunneling.

FIG. 6 shows a portion of a multi-socket, multi-node system illustrating the flow of command and response packets through the system in another example packet tunneling operation path. The packet flows are indicated, in roughly chronological order, by arrows sequentially numbered 601-625, thus illustrating the functioning of a system like system 200 of FIG. 2. As in FIG. 4, FIG. 6 shows, at the top, two sockets 650, 652 in a first node and, at the bottom, two sockets 658, 660 in a second node. The system further includes two node controllers 654, 656. Socket 650 comprises core 670, memory controller 672, home agent 674, and caching agent 676. Other sockets 652, 658, 660 are configured similarly. Ports on socket 650 can be connected via high-bandwidth processor interconnects to ports on other sockets and/or processor ports on node controllers. Thus, for example, processor interconnect 678 connects socket 650 with socket 652, while processor interconnect 680 connects socket 650 with node controller 654. The other sockets have similar connections, which, for simplicity of illustration, are not assigned reference labels.

Within node controller 654 are two sides separated by a broken line. The left side has blocks (e.g., chiplets) including socket interface block KT 682, local home blocks LH0 684 and LH1 686, remote home blocks RH0 688 and RH1 690, and system interconnect interface blocks NI0 692 and NI1 694. The right side of node controller 654 is similarly arranged. Connecting the left side to the right side is crossbar XB/RT 696. Node controller 656 is similarly arranged. The blocks described within the node controller are exemplary and a node controller may include other blocks and more or fewer of the blocks described. Shared-NID companion KT blocks within a node controller can be directly connected to provide packet tunneling between companion KT blocks; thus, for example, KT block 682 on the left side of node controller 654 can be directly connected to the right-side KT block. In the illustrated example, the tunneling permits the node controller to use only one NID for its two processor ports, instead of two NIDs in the node. Node controllers can be connected by node controller links (e.g., NUMAlinks) that may be of lower bandwidth than the processor interconnects. Thus, for example, node controllers 654 and 656 are connected by node controller link 698, rendered as a broken-outline double-headed arrow at the center of FIG. 6.

During the illustrated packet tunneling operation, the core of requesting socket 652, having NID 1, formulates a request for ownership (RFO) and sends 601 the request for ownership to the caching agent of requesting socket 652, whereupon a command packet, e.g., in the form of a read invalidate own request for a cache line (RdInvOwn), is formulated and transmitted 602 out the appropriate port over the processor interconnect connecting socket 652 to node controller 654, having NID 2. Within node controller 654, socket interface block KT sends 603 the received command packet (RdInvOwn) to remote home block RH0, which sends 604 the command packet (RdInvOwn) to system interconnect interface block NI1. The command packet (RdInvOwn) is then sent 605 over node controller link 698 to node controller 656 having NID 2 within its own node. Within node controller 656, system interconnect interface block NI0 sends 606 the command packet (RdInvOwn) to local home block LH0, which then sends 607 the command packet (RdInvOwn) to socket interface block KT for transmission out a processor port.

Node controller 656 then transmits 608 the command packet (RdInvOwn) over a high-bandwidth processor interconnect to socket 660, having NID 1 within its node. The home agent of socket 660 in turn sends 609 the cache line request from the command packet (rd) to the memory controller to fetch 610 the requested cache line data operand (Data).

The home agent of socket 660 determines that socket 660 is not the owner of the requested cache line and that fulfillment of the received command will involve taking ownership of the cache line. It therefore forwards 611 a command packet with a snoop to get data (SnpInvOwn) over another processor interconnect to socket 658. Then the caching agent of socket 658 sends 612 a snoop message (Snp) based on the snoop command packet received 611 from socket 660 to the corresponding core of socket 658, fetching 613 the requested data (Data) from the core to the caching agent of socket 658, which, in this case, is more up-to-date data than what resides at the home agent of socket 660, meaning that the data must be supplied back 614 as well as forwarded on 615 to the requester 656.

The caching agent of socket 658 therefore communicates 614 a cache line response packet (RspFwdIWb) to the home agent of socket 660 over the processor interconnect connecting sockets 658 and 660. This informs the home agent of socket 660 that the caching agent of socket 658 has forwarded data as well as ownership of the cache line to the requester, node controller 656. The caching agent of socket 658 also transmits 615 a data-bearing exclusive response packet (Data_E) with the requested data over yet another processor interconnect to the directly-connected processor port of node controller 656 also having NID 2. This response packet is received at a different node controller processor port than the processor port on which the command packet was sent out from node controller 656.

Having received 614 the communicated cache line response packet from the caching agent of socket 658 over a processor interconnect, the home agent of socket 660 transmits 616 an ordered completion response packet (CmpO) over a processor interconnect connecting socket 660 with the processor port of node controller 656 having NID 2. Using routing logic as discussed previously with respect to FIG. 5, the left KT block of node controller 656 recognizes that the data received 615 is not intended to go to the left-side LH blocks connected to the left-side KT block of node controller 656, but rather to one of the right-side LH blocks connected right-side KT block of node controller 656, the ambiguity having been created by both associated node controller processor ports sharing the same NID. The data complete exclusive response packet transmitted 615 from socket 658 to node controller 656 is accordingly tunneled 617 (Data_E) over from left-side socket interface block KT to right-side socket interface block KT of node controller 656. Within node controller 656, right-side socket interface block KT forwards both the received the data-bearing exclusive response packet (Data_E) 618 and the received ordered completion response packet (CmpO) 619 to local home block LH0. The ordered completion response packet 616, 619 tells local home block LH0 that the home agent of socket 660 has committed and updated the directory state of the directory in the socket's home agent, so that the local home block LH0 receiving the completion response packet 619 has certainty in ownership of the requested cache line.

A state machine in local home block LH0 can wait for receipt of both the data 618 and completion 619 response messages, whereupon local home block LH0 can combine the two response messages and can then send 620 a data complete exclusive response packet (Data_E_CmpO) to system interconnect interface block NI0. Node controller 656 transmits 621 the data complete exclusive response packet (Data_E_CmpO) over a node controller link to node controller 654 (NID 2 in its node). Within node controller 654, system interconnect interface block NI1 sends 622 the response packet (Data_E_CmpO) to remote home block RH0, which then sends 623 the response packet (Data_E_CmpO) to socket interface block KT.

Node controller 654 then transmits 624 the response packet (Data_E_CmpO) to requesting socket 652 over the high-bandwidth processor interconnect that connects node controller 654 and socket 652. The caching agent of socket 652 then sends 625 the requested data (Data) in the response packet to the core of socket 652.

Absent the packet tunneling provided by the direct links between companion KT blocks in a node controller and the routing and packet modification logic in the KT blocks, each KT block would be assigned a separate NID. The caching agent of socket 658 would not, therefore, be able to transmit its data packet 615 to the directly-connected node controller 656 because it would not view the directly-connected processor port (corresponding to the left-side KT block of node controller 656) as having the same NID as the requesting NID (corresponding to the right-side KT block of node controller 656). Instead, the data packet would be transmitted back to socket 660, and socket 660 would then send that data packet to the corresponding KT block (i.e., the right-side KT block of node controller 656). The tunneling thus permits two-port node controllers to consume only a single NID instead of two NIDs.

Whereas in the example of FIG. 5 both the command packet and the response packet are tunneled, only the response packet is tunneled in the example of FIG. 6. The particular command and response packet types are provided as examples and may differ in other examples.

The present application describes systems and methods for tunneling packets between processor nodes in a multi-socket computer system and without consuming additional NIDs and in some examples without going through node controller interconnects. The systems and methods thereby provide higher bandwidth and lower latency while being able to make use of lower-cost, less-capable processor sockets. While glueless systems can eliminate the need for node controllers, in order to accommodate a greater number of sockets, glueless systems are required to use more expensive processors that are capable of providing a larger number of node identifiers (NIDs) (e.g., eight). The systems and methods herein do not have this drawback.

One example includes a computer system with multi-processor nodes. Each node has a number sockets each identified by a NID that is unique within the node, and each socket has a processor and a memory connected by an interface (e.g., a bus). Processor interconnects directly connect at least some of the sockets in the node each to another socket in the node. Node controllers in the system each have processor ports for connection to sockets via processor interconnects, and node controller links for connection to other node controllers. For at least one of the node controllers, at least processor ports share a single NID used by connected sockets to address the node controller as a proxy for other sockets connected within the system via processor interconnects.

Another example includes a node controller chip having different divisions, each division having at least one socket interface chiplet for connection via a processor interconnect to one of a plurality of sockets each socket identified within its respective node by a unique node identifier (NID) and each socket comprising a processor and a memory connected by an interface. Each division further has a plurality of local home and remote home blocks (e.g., chiplets) configured to route and track request and response packets. Each division also has a plurality of system interconnect interface chiplets for connection via node controller links to other node controller chips. At least two of the socket interface chiplets have a common NID associated therewith and are directly connected within the node controller chip to tunnel packets between socket interface chiplets without the packets being routed through the local home, remote home, or system interconnect interface chiplets.

Another example includes a method of packet tunneling in a multi-socket system. A node controller receives a command packet addressed to a destination socket from a source socket in a multiprocessor computer system. The system comprises multiple nodes, each of the nodes having multiple sockets. Each socket has at least one computer processor and a memory, and is connected to other sockets in its node via memory-coherent interconnects. A destination identifier (destination ID) in the command packed is examined and it is determined that the destination socket is not the source socket. A request address in the command packet is examined and it is determined that the destination socket is not a remote connected socket to which the node controller is not connected via one of a plurality of processor ports in the node controller. Based on these determinations, the command packet's destination ID and source identifier (source ID) are replaced, and data protection information in the command packet is recalculated and replaced. The node controller then sends the command packet to the destination socket over a memory-coherent interconnect different from the one over which it was received.

The preceding description has been presented to illustrate and describe examples of the principles described. This description is not intended to be exhaustive or to limit these principles to any precise form disclosed. Many modifications and variations are possible in light of the above teaching. What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A computer system comprising:
a plurality of multi-processor nodes each comprising:
a plurality of sockets each identified within the respective node by a unique node identifier (NID) and each comprising a processor and a memory connected by an interface;
a plurality of processor interconnects directly connecting at least some of the sockets in the node each to another socket in the node; and
a node controller comprising:
a plurality of processor ports for connection to sockets via processor interconnects, each processor port having a NID; and
a plurality of node controller link ports for connection to other node controllers via node controller links;
wherein at least two processor ports of the node controller share a single NID used by connected sockets to address the node controller as a proxy for other sockets connected within the system.

2. The system of claim 1, further comprising:
a first processor interconnect connecting a first of the plurality of processor ports of the node controller to a first socket in a first node; and
a second processor interconnect connecting a second of the plurality of processor ports of the node controller to a second socket in a second node,
wherein the first and second processor ports share a first NID.

3. The system of claim 2, further comprising:
a third processor interconnect connecting a third processor port of the node controller to a third socket in the first node; and
a fourth processor interconnect connecting a fourth processor port of the node controller to a fourth socket in the second node,
wherein the third and fourth processor ports share a second NID.

4. The system of claim 2, further comprising:
a third processor interconnect connecting at least one of the plurality of processor ports of a second node controller to a socket in the first node; and
a fourth processor interconnect connecting at least one other of the plurality of processor ports of the second node controller to a socket in the second node.

5. The system of claim 1, wherein node controller is configured to tunnel a request packet received from a socket in one node to a socket in another node without routing the request packet through any of the node controller links.

6. The system of claim 1, wherein the node controller is configured to tunnel a response packet received from a different socket than the socket to which a corresponding request packet was sent sharing the single NID are each in a different node.

7. The system of claim 1, wherein the system is a non-uniform memory access (NUMA) system.

8. A node controller chip comprising:
a plurality of divisions, each division comprising:
at least one socket interface chiplet for connection via a processor interconnect to one of a plurality of sockets each socket identified within its respective node by a unique node identifier (NID) and each comprising a processor and a memory connected by an interface;
a plurality of local home and remote home chiplets configured to route and track request and response packets;
a plurality of system interconnect interface chiplets for connection via node controller links to other node controller chips;
wherein at least two of the socket interface chiplets have a common NID associated therewith and are directly connected within the node controller chip to tunnel packets between socket interface chiplets without the packets being routed through the local home, remote home, or system interconnect interface chiplets.

9. The node controller chip of claim 8, wherein companion socket interface chiplets sharing a common NID each comprise routing logic configured to determine, based on memory address information in a routed packet, whether the routed packet should be routed through a local home or remote home chiplet or, alternatively, should be tunneled to a companion socket interface chiplet.

10. The node controller chip of claim 9, wherein companion socket interface chiplets sharing a common NID each further comprise packet modification logic to examine and alter a packet destination NID in the routed packet, to replace packet source NID in the routed packet, and to recalculate and replace data protection information in the routed packet.

11. The node controller chip of claim 8, wherein the node controller links are NUMAlinks.

12. The node controller chip of claim 8 having exactly four socket interface chiplets sharing two NIDs altogether.

13. The node controller chip of claim 8 having exactly two socket interface chiplets sharing a single NID.

14. A method comprising:
a node controller receiving a command packet addressed to a destination socket from a source socket in a multiprocessor computer system comprising multiple nodes each having multiple sockets, each socket comprising at least one computer processor and a memory, each socket connected to other sockets in its node via memory-coherent interconnects;
based on determining by examination of a destination identifier (destination ID) in the command packet that the destination socket is not the source socket, and further based on determining by examination of a request address in the command packet that the destination socket is not a remote connected socket to which the node controller is not connected via one of a plurality of processor ports in the node controller:
replacing the destination ID in the command packet;
replacing a source identifier (source ID) in the command packet;
recalculating and replacing data protection information in the command packet; and
the node controller sending the command packet to the destination socket over a memory-coherent interconnect different from the one over which it was received.

15. The method of claim 14, wherein the command packet includes a request for data from memory in the destination socket.

* * * * *